(12) United States Patent
Wagner

(10) Patent No.: US 8,685,176 B2
(45) Date of Patent: Apr. 1, 2014

(54) SYSTEM AND METHOD FOR OPTIMIZED GAS TURBINE COMPRESSOR CLEANING AND PERFORMANCE MEASUREMENT

(75) Inventor: Thomas Wagner, Troy, NY (US)

(73) Assignee: EcoServices, LLC, Farmington, CT (US)

( * ) Notice: Subject to any disclaimer, the term of this patent is extended or adjusted under 35 U.S.C. 154(b) by 1145 days.

(21) Appl. No.: 11/866,530

(22) Filed: Oct. 3, 2007

(65) Prior Publication Data
US 2008/0173330 A1    Jul. 24, 2008

Related U.S. Application Data

(60) Provisional application No. 60/852,041, filed on Oct. 16, 2006.

(51) Int. Cl.
| | |
|---|---|
| F04D 29/70 | (2006.01) |
| B08B 3/08 | (2006.01) |
| B08B 9/027 | (2006.01) |
| G01N 1/22 | (2006.01) |
| B08B 13/00 | (2006.01) |

(52) U.S. Cl.
USPC ............ 134/56 R; 134/113; 134/169 A

(58) Field of Classification Search
USPC ................ 134/123, 169 A, 113, 56 R
See application file for complete search history.

(56) References Cited

U.S. PATENT DOCUMENTS

| | | | |
|---|---|---|---|
| 5,011,540 A | 4/1991 | McDermott | 134/23 |
| 5,241,845 A * | 9/1993 | Ishibashi et al. | 68/12.02 |
| 5,318,254 A | 6/1994 | Shaw et al. | 244/134 |
| 5,438,507 A * | 8/1995 | Kim et al. | 700/1 |
| 5,868,860 A | 2/1999 | Asplund | |
| 5,899,217 A | 5/1999 | Testman, Jr. | 134/104 A |
| 6,491,048 B1 * | 12/2002 | Foster | 134/169 A |
| 6,675,437 B1 | 1/2004 | York | 15/321 |
| 6,694,804 B1 * | 2/2004 | Roelofs | 73/60.11 |
| 7,045,021 B2 * | 5/2006 | Ewing et al. | 134/29 |

(Continued)

FOREIGN PATENT DOCUMENTS

| | | | | |
|---|---|---|---|---|
| DE | 2154594 | * | 3/1973 | |
| DE | 2701823 | | 8/1977 | B60S 3/00 |

(Continued)

OTHER PUBLICATIONS

European Patent Office 0 095 378 Nov. 1983.*

(Continued)

*Primary Examiner* — Michael Barr
*Assistant Examiner* — Benjamin L Osterhout
(74) *Attorney, Agent, or Firm* — Kinney & Lange, P.A.

(57) ABSTRACT

The present invention is directed to a system and method for optimizing a wash procedure. Embodiments of the present invention are directed to a system for optimizing a wash procedure. In a first embodiment, a system comprises: means for collecting a sample of fouling, wherein the sample of fouling comprises one or more contaminates; means for identifying the one or more contaminates; and means for selecting one or more washing products for removing the one or more contaminates from a turbine. In an alternate embodiment, the present invention is directed to a method for optimizing a wash procedure. The method comprises: collecting a sample of fouling, wherein the sample of fouling comprises one or more contaminates; identifying the one or more contaminates; and selecting one or more washing products for removing the one or more contaminates from a turbine.

23 Claims, 6 Drawing Sheets

(56) References Cited

U.S. PATENT DOCUMENTS

| | | | |
|---|---|---|---|
| 7,109,095 B2 * | 9/2006 | Notake et al. | 438/478 |
| 7,114,209 B2 * | 10/2006 | Metzger-Groom et al. | 8/158 |
| 2002/0001255 A1 | 1/2002 | Flood et al. | 366/8 |
| 2002/0096197 A1 * | 7/2002 | Ackerman et al. | 134/22.18 |
| 2001/0209256 | 11/2003 | Tadsyon | 134/10 |
| 2004/0220817 A1 * | 11/2004 | Sanville et al. | 705/1 |
| 2005/0096832 A1 | 5/2005 | Takada et al. | |
| 2006/0081521 A1 * | 4/2006 | Hjerpe et al. | 210/171 |
| 2009/0050183 A1 | 2/2009 | Rice et al. | 134/101 |

FOREIGN PATENT DOCUMENTS

| | | | | |
|---|---|---|---|---|
| DE | G 94 20 362.8 | | 3/1995 | B65D 90/24 |
| DE | 103 55 353 | * | 7/2005 | |
| EP | 0 628 477 | | 12/1994 | B64F 5/00 |
| FR | 2 846 221 | * | 4/2004 | |
| JP | 07-174714 | * | 7/1995 | |
| JP | 2000-274206 | * | 10/2000 | |
| JP | 2006-061217 | * | 3/2006 | |
| KR | 9408599 | * | 9/1994 | |
| KR | 10-1998-0017193 | | 6/1998 | B01D 61/44 |
| RU | 1824943 | * | 1/1997 | |
| SU | 1076642 | * | 2/1984 | |
| WO | WO 02/36713 | | 5/2002 | |
| WO | WO 2005/077554 A1 | | 8/2005 | |

OTHER PUBLICATIONS

WIPO WO 96/40453 Dec. 1996.*

* cited by examiner

SYSTEM AND METHOD FOR OPTIMIZED GAS TURBINE COMPRESSOR CLEANING AND PERFORMANCE MEASUREMENT

CROSS-REFERENCE TO RELATED APPLICATIONS

This application claims the benefit of U.S. Provisional Patent Application No. 60/852,041, filed Oct. 16, 2006 and entitled "System and Method for Optimized Gas Turbine Compressor Cleaning and Performance Measurement," the contents of which are hereby incorporated by reference.

FIELD OF THE INVENTION

The present invention relates to cleaning and performance measurement of turbines. More specifically, the present invention relates to a system and method for optimized cleaning and performance measurement of gas turbine compressors.

BACKGROUND

Gas turbines play a predominate role in a number of applications, namely in aircraft propulsion, marine propulsion, power generation, and driving processes such as pumps and compressors. Typically, a gas turbine includes a compressor, a combustor, and a turbine. In operation, air is fed into the system where it is compressed by a compressor and further mixed with fuel. The compressed air and fuel mixture are then burned to cause an expansion, which is responsible for driving the turbine. Thus, gas turbines require large quantities of air to create the torque driving the turbine. A typical gas turbine may devote up to 65% of its available energy to compress the air being fed into the turbine. Consequently, any loss in compressor effectiveness will cause degradation and a significant loss in lost performance.

Due to the large quantities of air utilized by the turbines, a large amount of airborne contaminates, pollen, insects, and dust just to name a few, are fed into the compressor. Thus, an issue arises wherein contaminates or foreign particles, commonly referred to as fouling, collect and build up in the turbine, particularly in the compressor. Fouling of the compressor reduces the compressor efficiency. Reduced compressor efficiency means that the compressor requires more power for compressing the same amount of air. As a result, the power required for driving the compressor increases and thus, the surplus power decreases, meaning less available power to drive the turbine. Furthermore, a decrease in available power may lead to a lower overall power output. As it will be recognized by one of ordinary skill in the art, it is desirable to provide maximum power to the turbine in order to produce a higher output, and thus compressor degradation should be avoided.

Conventional turbine systems, in some cases, provide filters in an attempt to prevent fouling from entering the system, namely the compressor. In other cases, air is fed directly into the compressor without filtering. However, in either case, contaminates are passed into the system and eventually, the compressor is fouled by the contamination. As previously discussed, the result of the compressor fouling is a significant loss in performance and a significant increase in fuel consumption. Therefore, it is desirable to avoid such consequences.

As it will be recognized by one of ordinary skill in the art, maintaining gas turbine performance is an important consideration and therefore the removal of the compressor fouling is a standard best practice to regain any lost performance. Typically, the removal of fouling requires the use of compressor washing to maintain compressor efficiency. If compressor fouling is not addressed, compressor efficiency may decrease and as a result, system output will decrease, while fuel consumption will increase. A conventional means for removing fouling is to wash the particles that have already adhered system. In practice, washing the gas turbine is performed by injecting a wash solution upstream of the compressor inlet. By allowing the gas turbine rotor to rotate during wash, the solution is forced through the compressor and exits at the rear of the gas turbine. The solution may include water, various chemical agents, detergents, solvents, or any combination thereof.

However, fouling does not have a defined composition and typically any number of factors may influence its composition. For example, types of contaminates and quantities of contaminates may vary from location to location; one location may have a higher concentration of a certain contaminate, whereas a different location may have a lower concentration of that contaminate. Additionally, different locations may have completely different contaminates from another location. Furthermore, contamination may have a seasonal variation due to such things as local vegetation, industrial process, prevailing weather, or other ambient factors. Fouling can include generally any combination of contaminates and consequently, the various compositions of fouling are almost endless. As a result, washing procedures must also vary to cope with the variation in contaminates.

Accordingly, there is a need for a system and method for sampling and analysis of fouling composition such that washing may be optimized to cope with the varying compositions of fouling. Furthermore, there is a need for a system and method for continuous assessment of the ambient conditions, turbine parameters, turbine performance, and namely, the affect of the optimized washing on performance of the turbine. Application of an optimized wash process and such system and ambient condition assessment can ascertain the fullest recovery due to fouling and furthermore, identify other causes for performance degradation, thus, providing a means for optimized overall performance and fuel utilization.

SUMMARY OF THE INVENTION

Embodiments of the present invention are directed to a system for optimizing a wash procedure. In a first embodiment, a system comprises: means for collecting a sample of fouling, wherein the sample of fouling comprises one or more contaminates; means for identifying the one or more contaminates; and means for selecting one or more washing products for removing the one or more contaminates from a turbine.

In an alternate embodiment, the present invention is directed to a method for optimizing a wash procedure. The method comprises: collecting a sample of fouling, wherein the sample of fouling comprises one or more contaminates; identifying the one or more contaminates; and selecting one or more washing products for removing the one or more contaminates from a turbine.

DETAILED DESCRIPTION

Described herein is a system and method for cleaning and monitoring gas turbine compressors. To this end, the present invention relates to sampling and identify fouling to determine its composition, selecting a washing product comprising one or more detergents and/or wetting agents based on the fouling composition, cleaning a gas turbine compressor using the selected cleaner, and monitoring ambient conditions, turbine performance, and/or other factors to assess the effectiveness of the selected cleaner. Based on this assessment, the selected washing product may be re-selected and/or adjusted as appropriate.

As previously discussed, due to the large quantities of air utilized by gas turbine compressors, a large amount of airborne contaminates are fed into turbine compressors, resulting in fouling adhering to and collecting in such compressors. In order to remove this fouling, so as to maintain optimal turbine performance, a sample of the fouling must first be collected. Once collected, the fouling may be identified to determine its composition, which as discussed below, is useful in selecting one or washing products for use in the removal of such fouling.

Figure 1A:
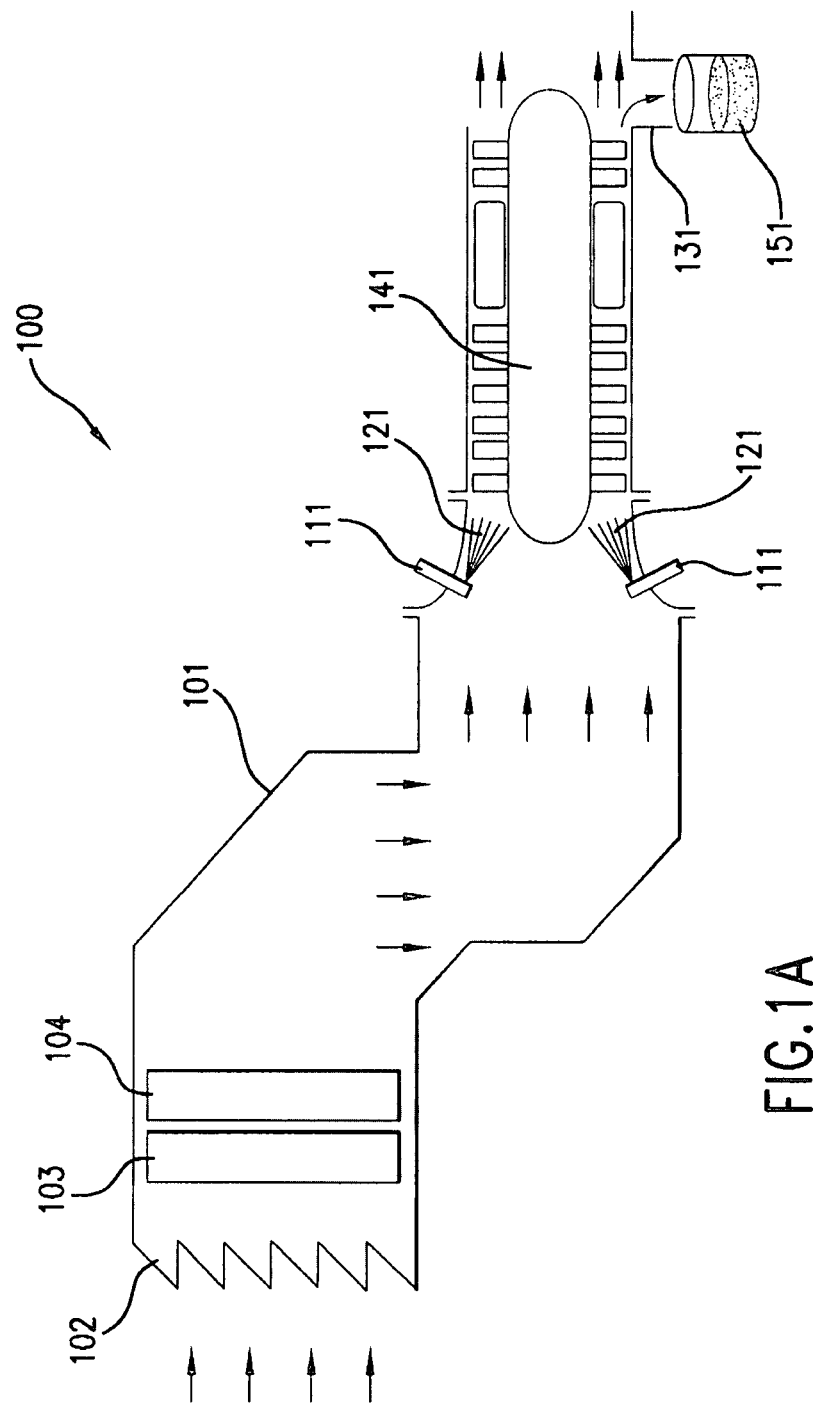
FIG. 1A illustrates a cutaway view of an exemplary turbine, in accordance with the present invention.

Referring now to FIG. 1A, a cross-sectional view of an exemplary turbine 100 is shown. Arrows depict the direction of the air flow. Ambient air enters the duct 101 via the weather louver 102, via the trash screen 103, and via the air filter 104 to the inlet of the gas turbine 100. Washing a gas turbine 100 may be performed by injecting a wash solution 121 from a nozzle 111, upstream of the compressor 141, which is then forced through the compressor 141, thereby washing off and removing residual build up of fouling from the compressor 141. This solution 121 may include, for example, water, various chemical agents, detergents, solvents, or any combination thereof.

Figure 1B:
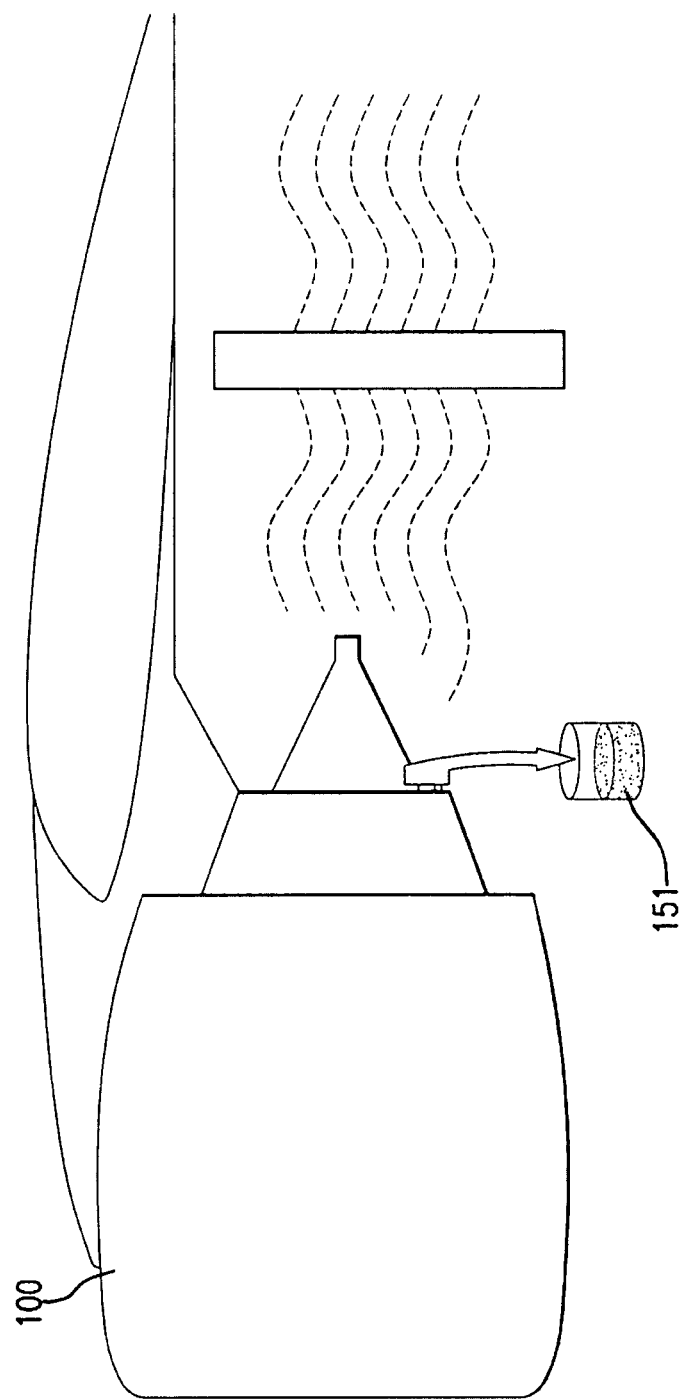
FIG. 1B illustrates a side view of the exemplary turbine, in accordance with the present invention.

As a result of forcing the solution 121 through the compressor 141, a mixture 151 comprising the washing solution 121 and fouling removed during the wash is formed. Some of this mixture 151 is forced out of a rear portion (not shown) of the gas turbine 100, while the rest of the mixture 151 collects in a discharge drain 131. As further described below, a sample of the discharged mixture 151, i.e., a 'water wash and rinse sample', may be utilized to determine the composition of the fouling comprised therein. Referring briefly to FIG. 1B, a side view of an exemplary turbine 100 is shown having a sample of the discharged mixture 151 being collected therefrom.

Alternatively, a sample of fouling may be obtained directly from a blade of the turbine. Such a sample is known as a 'physical sample'. Physical samples may be removed from turbine blades using any appropriate means, such as for example, using a solvent, fine abrasive paper, etc. It will be recognized by those skilled in the art, that a sample of fouling may be obtained manually, mechanically, robotically, or by any other appropriate means.

Figure 2:
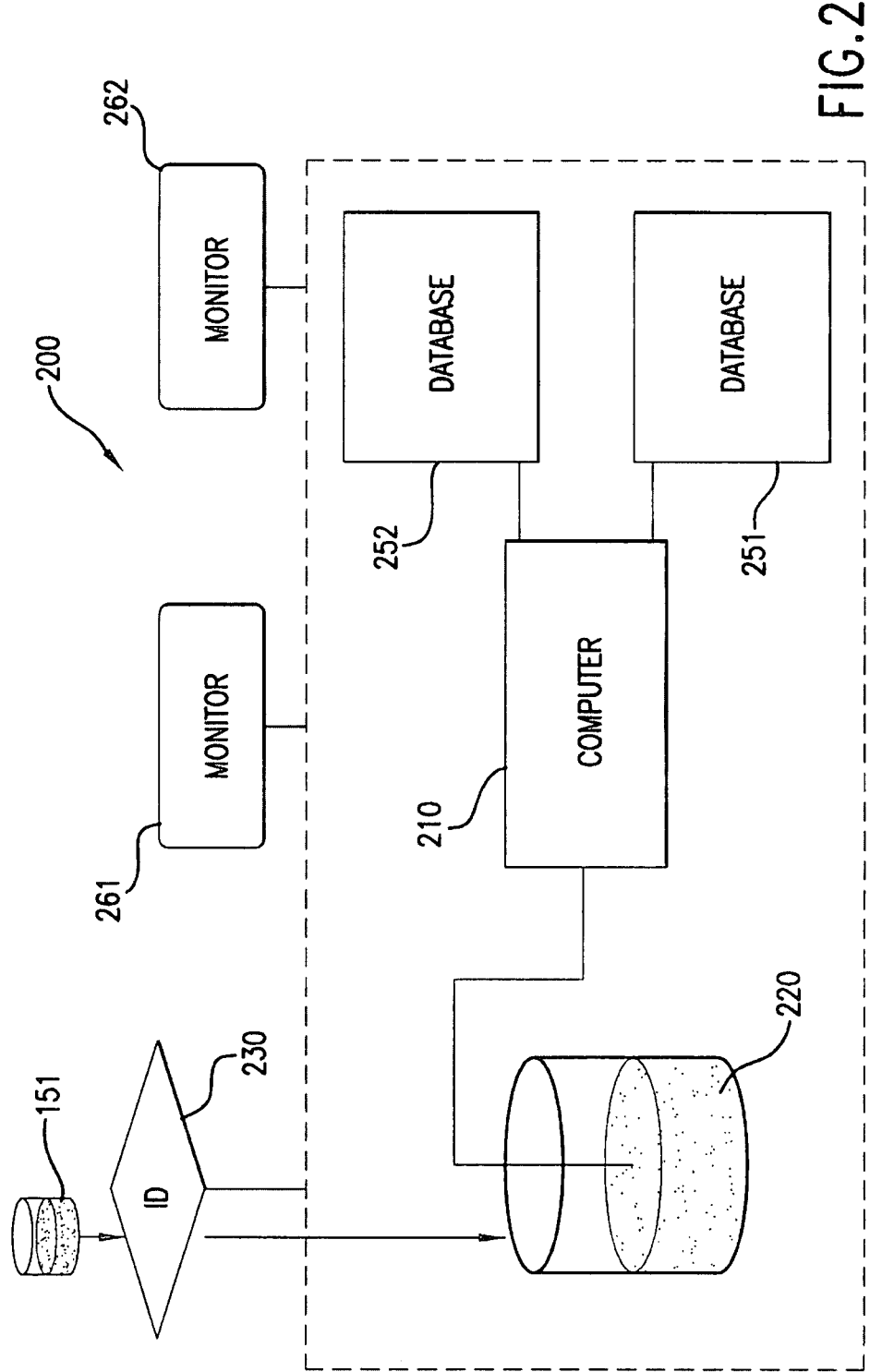
FIG. 2 illustrates a wash optimization system, in accordance with embodiments of the present invention.

Referring now to FIG. 2, a wash optimization system 200, in accordance with embodiments of the present invention is shown. In a preferred embodiment, the wash optimization system 200 includes a computer 210. As will be recognized by those skilled in the art, any one or multiple appropriate computers, computing devices, processors, controllers, microcontrollers, etc., or combination thereof may be used. The computer 210 may include a storage means (not shown). The storage means may include a random access memory (RAM) and/or a non-volatile memory such as read-only memory (ROM). One of ordinary skill in the art readily understands that a storage means can include various types of physical devices for temporary and/or persistent storage of data including, but not limited to, solid state, magnetic, optical and combination devices. For example, the storage means may be implemented using one or more physical devices such as DRAM, PROMS, EPROMS, EEPROMS, flash memory, and the like. The storage means may further comprise a computer program product including software code portions for performing optimization steps in accordance with embodiments of the present invention when the computer program product is run on the computer, as further discussed below. The computer 210 may be connected to a plurality of external devices such as, for example, databases such as 251 and 252, monitoring units 261 and 262, networks, I/O, external memories, sensors, measuring devices, and other appropriate peripheral devices.

Figure 3:
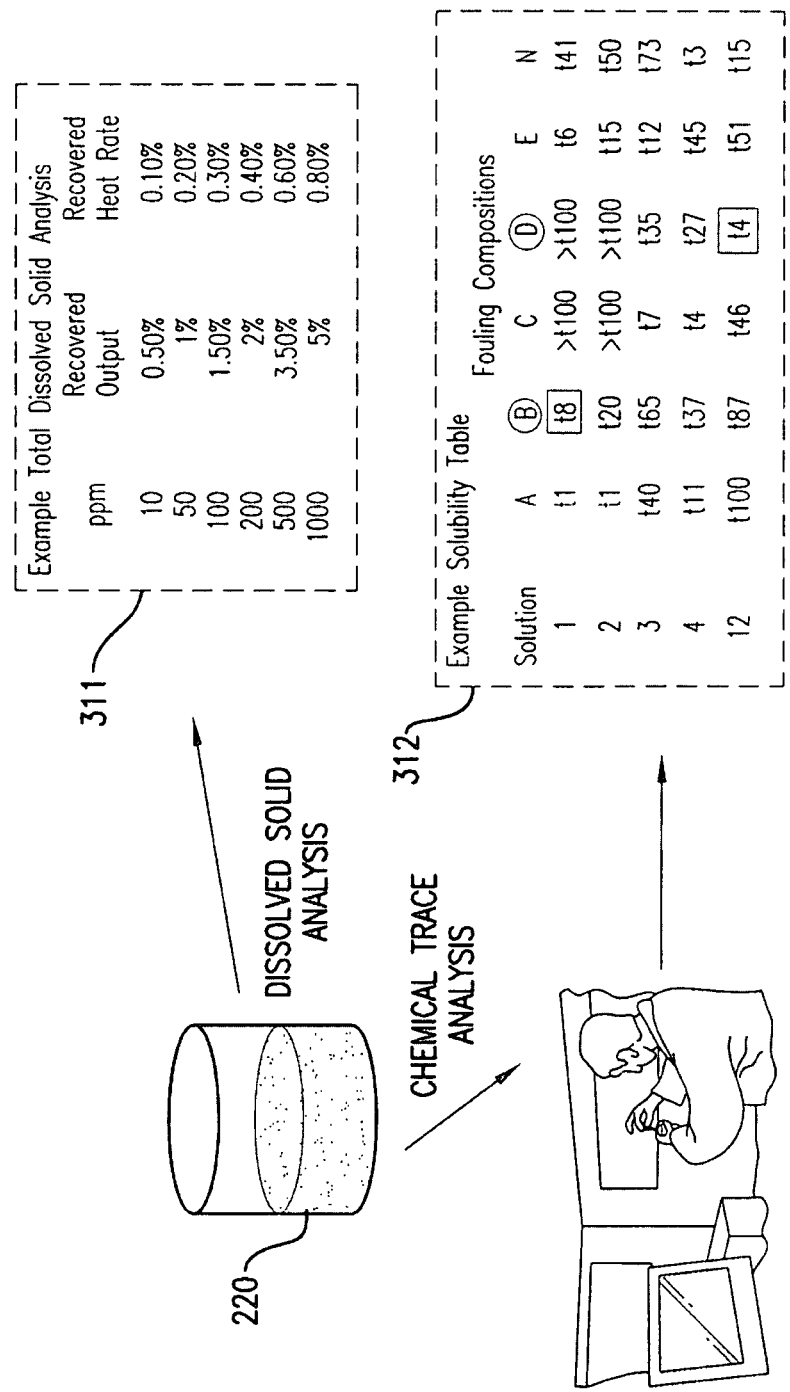
FIG. 3 illustrates exemplary identified contaminate data used for selecting an optimized wash procedure, in accordance with embodiments of the present invention.

The wash optimization system 200 further includes an identification unit 230, which may be used to isolate the one or more contaminates from a collection means (not shown), of sample 151 and/or analyze and identify the one or more contaminates. The collection means (not shown) may be, for example, solution, detergent, solvent, chemical agent, abrasive paper, and the like. The identification unit 230 is be used to separate the one or more contaminates from the sample 151 provided by the collection means, thereby producing a sample of one or more contaminates, hereinafter a 'contaminate sample' 220. In the case where the collection means is a wash and the sample 151 comprises a mixture of washing solution and contaminates, or in the case where the collection means is a solvent and the sample 151 comprises a solvent and contaminates, the identification unit 230 is preferably a mass spectrometer. As will be recognized by those skilled in the art, mass spectrometers are commonly used to measure the electron shell spectrum of chemical elements that make up a solution and allow identification of compounds that make up the solution. The identification unit 230, or in a preferred embodiment, mass spectrometer, is then used to identify the one or more contaminates of sample 220. As a result, data regarding the identified contaminates is produced. The identified data intends to accomplish two tasks. First, the total dissolved particles read out will provide an indication of compressor cleanliness; the lower total dissolved solids indicates, the higher degree of cleaning. Second, the composition of the resulting rinse and fouling removed indicates what the contaminate is. The data produced may be displayed by identification unit 230, printed, etc. or, preferably, the computer 210 is connected to the identification unit 230 and the resulting identified contaminate data is displayed by the computer 210. Referring briefly to FIG. 3, exemplary identified data 311 is shown.

Referring back to FIG. 2, the wash optimization system 200 may also include a washing product database 251. This database 251 may comprise a manually searchable document or a computer readable product. If the database 251, is a computer readable product, the washing product database 251 is preferably connected to the computer 210, but is not limited thereto. The term 'washing products', as described herein, may be, but is not limited to, any appropriate detergent, chemical agent, solvent, wetting agent, or any other appropriate washing products, or any combination thereof.

The washing product database 251 preferably includes a plurality of commercially available washing products and information relating to the solubility of known contaminates in each of the plurality of washing products. In the washing product database 251, washing products are preferably categorized according to their respective ability to remove various contaminates. More specifically, each washing product within the washing product database 251, preferably comprises a listing of contaminates that the respective product can remove and an established scale rating of how effective the product is in removing the contaminate.

Additionally, the database 251 may be searched by any appropriate means. The computer 210 is preferably programmed to compare the one or more identified contaminates to washing products of database 251. In practice, preferably the computer 210 may be used to perform a manual or automated search of washing products in database 251 wherein one or more contaminates are compared to the solubility of the one or more washing products. In a preferred implementation, washing products of database 251 are searched using a search engine feature and as a result, a list of commercially available washing products may be produced. The resulting list is categorized according to the ability of the washing product to remove various contaminates. More specifically, each washing product within the populated list comprises a listing of contaminates that the respective washing products can remove, and an established scale rating of how well the products can remove particular contaminates. Additionally, the database 251 comprises data regarding an optimal amount of time with which to apply the washing product to each contaminate. More specifically, for each washing product, listed is the amount of time required for that washing product to remove an amount of a given contaminate. As discussed further, these times are preferably utilized in predetermining the amount of time to apply the one or more selected washing products. The computer 210 is then programmed to and used to plot the listed washing products on a solubility index, in order to determine the best washing product to use for removing a specific contaminate or combination of contaminates. As will be recognized by those skilled in the art, a solubility index is a measure of how soluble a chemical compound is in a solution, which is expressed as a time to achieve so much of the material into solution. Referring briefly to FIG. 3, an exemplary solubility index 312 is shown.

Referring back to FIG. 2, the wash optimization system 200 may also include an ambient condition database 252. Preferably, the ambient condition database 252 is a computer readable product connected to the computer 210, although the ambient condition database 252 may comprise any manually searchable document, but is not limited thereto. As will be recognized by one of ordinary skill in the art, fouling does not have a defined composition and typically any number of factors may influence its composition. For example, types of contaminates and quantities of contaminates may vary from location to location, as one location may have a higher concentration of a certain contaminate, whereas a different location may have a lower concentration of that contaminate or no trace of the contaminate at all. Furthermore, contamination may have a seasonal variation due to such things as local vegetation, industrial process, prevailing weather. Other ambient factors may also vary. As a result, to cope with the variation in contaminates, such considerations are preferably taken into account, in selecting an appropriate washing product. Thus, ambient condition database 252 preferably includes data relating to such ambient conditions. The ambient conditions may include, but are not limited to, weather temperature, weather humidity, weather pressure, season, and location. Additionally, in the ambient condition database 252, ambient conditions are preferably categorized according to their respective contaminate composition. More specifically, each ambient condition comprises a listing of contaminates associated with the condition. For example, and solely for illustrative purposes, if the ambient condition was the season of Spring, then one of the listed conditions might be pollen.

The wash optimization system 200 may also include an ambient condition monitoring unit 261 which may monitor ambient conditions to allow the turbine performance to be corrected to a common ambient reference point. This will allow performance data to be used as the second check of cleaning effectiveness in order to more effectively help identify other factors with the equipment that may be hindering turbine performance. The ambient condition monitoring unit 261 may be connected to computer 210 or may be connected to the ambient condition database 252 or preferably both. Additionally, information relating to conditions collected by the ambient condition monitoring unit 261 may be transmitted directly to the computer 210 or to the ambient condition database 252 or preferably both. In one embodiment, the ambient condition monitoring unit 261 is a weather monitoring unit that collects ambient weather conditions. The ambient conditions may comprise environmental factors that possibly influence the operation of the gas turbine, including but limited to, weather temperature, weather humidity, and weather air pressure.

The computer 210 may further be programmed to formulate a wash procedure. The computer 210 preferably formulates the wash procedure by selecting the best washing products according to the results obtained from the identification unit 230 as cross-referenced with the washing product database 251, the ambient condition database 252, and by monitoring ambient conditions, as well as by calculating the optimal time for application of the selected washing product. The optimal time may be calculated according data contained in washing product database 251.

As previously mentioned, optimal performance of a turbine maximizes production, while minimizing the amount of fuel used. Contaminates act to reduce the turbine's compressor efficiency, and therefore the collection of contaminates is preferably avoided by washing the turbine. However, in order to effectively gauge the effectiveness of the washing procedure, data is preferably collected both before and after washing. The term 'washing procedure' used throughout describes the selected washing products and the application of those products for a predetermined amount of time. Preferably, the collected data includes ambient data, as previously discussed, as well as turbine performance data. The computer 210 may be further programmed to collect data relating to ambient conditions and/or turbine performance. In order to collect turbine performance data, the wash optimization system 200 may include a turbine monitoring unit 262. The turbine monitoring unit 262 may include, but is not limited to, sensors, gauges, measuring devices, and other appropriate devices, and may monitor, for example, such things as fuel flow, thrust, output, and turbine pressure. Data may be collected from the turbine monitoring unit 262 manually or automatically and preferably is transferred to computer 210. Preferably, the computer 210 is used to display a plurality of information regarding the performance data collected.

Figures 4A, 4B:
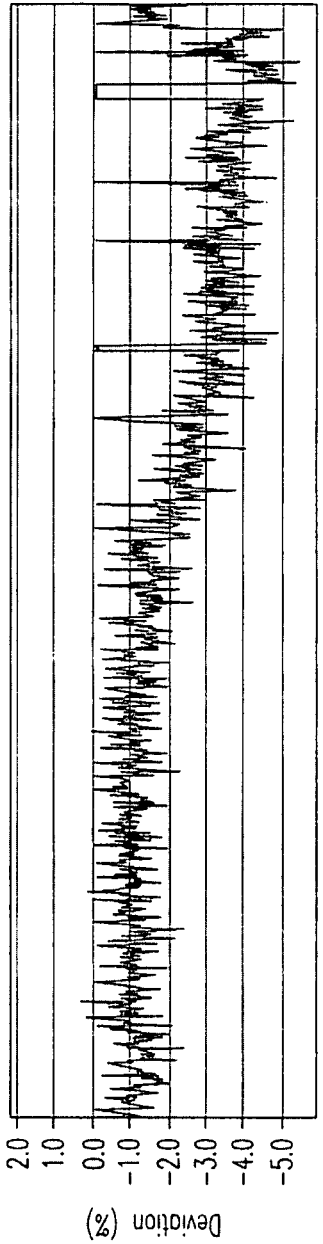
FIG. 4 illustrates an exemplary screen shot of compared performance data, in accordance with embodiments of the present invention.

In order to achieve optimal turbine performance, the effectiveness of a particular washing procedure used may be determined by comparing the performance of the turbine before and after being washed. Ideally, the washing procedure selected acts to improve and preferably maximize performance of a turbine by removing all, but trace amounts of contaminates, therefrom. Furthermore, an ideal performance benchmark is preferably determined such that the benchmark represents an expected level of performance of the turbine. Therefore, in a preferred embodiment, the computer 210 is further programmed to (a) compare first and second data sets collected before the turbine is washed with first and second data sets collected after the turbine is washed; and (b) formulate an optimized wash procedure. Preferably, the computer 210 is used to display a plurality of information regarding the compared performance data collected. Referring briefly to FIG. 4, an exemplary screen shot of the compared performance data 400 is shown.

Referring back to FIG. 2, preferably, the computer 210 is programmed to compare the turbine performance data collected after the wash procedure to the performance data collected before the wash, to determine the increase, or lack thereof, in turbine performance. As will be recognized by one of ordinary skill in the art, after washing the turbine, performance may and preferably will increase substantially. Therefore, the increase may be compared using the computer 210 to a benchmark performance level. Preferably, the increase is compared by computer 210 to the benchmark performance level, to determine if the selected washing procedure resulted in an optimal wash, thereby resulting in a restoration of maximum turbine performance.

In the case where optimal performance of the turbine is not achieved, the computer 210 is preferably configured to reformulate the selected washing procedure, in ways already discussed, so as to optimally wash the turbine, thus providing maximum performance to the turbine.

The wash optimization system 200 may be used in conjunction with any conventional washing system, in accordance with the present invention. For example, U.S. Pat. No. 5,868,860, issued Feb. 9, 1999, and in PCT/SE Patent Application 2004/000194, filed Feb. 16, 2004 discloses examples of the washing of gas turbine compressors are herein incorporated by reference. Preferably, wash optimization system 200 is connected to a turbine washing unit or system, such as the system described in the aforementioned patents, and furthermore directly connected to the computer 210 such that the computer 210 may control the washing unit. Thus, the formulated and reformulated washing procedures may be controlled by the computer 210 and implemented in a washing system.

The wash optimization system 200 may be used repeatedly, as many times as desired. Preferably, the wash optimization system 200 is used two or more times and the ambient and performance data collected before and after each wash may tracked and saved. Using the tracked data, a performance trend may be developed. The computer 210 may be further programmed to track, save, develop, and display such a performance trend, based on the sets of collected data. Referring to FIG. 4, graph 410 illustrates an exemplary performance trend plot, in accordance with the present invention.

Figure 5:
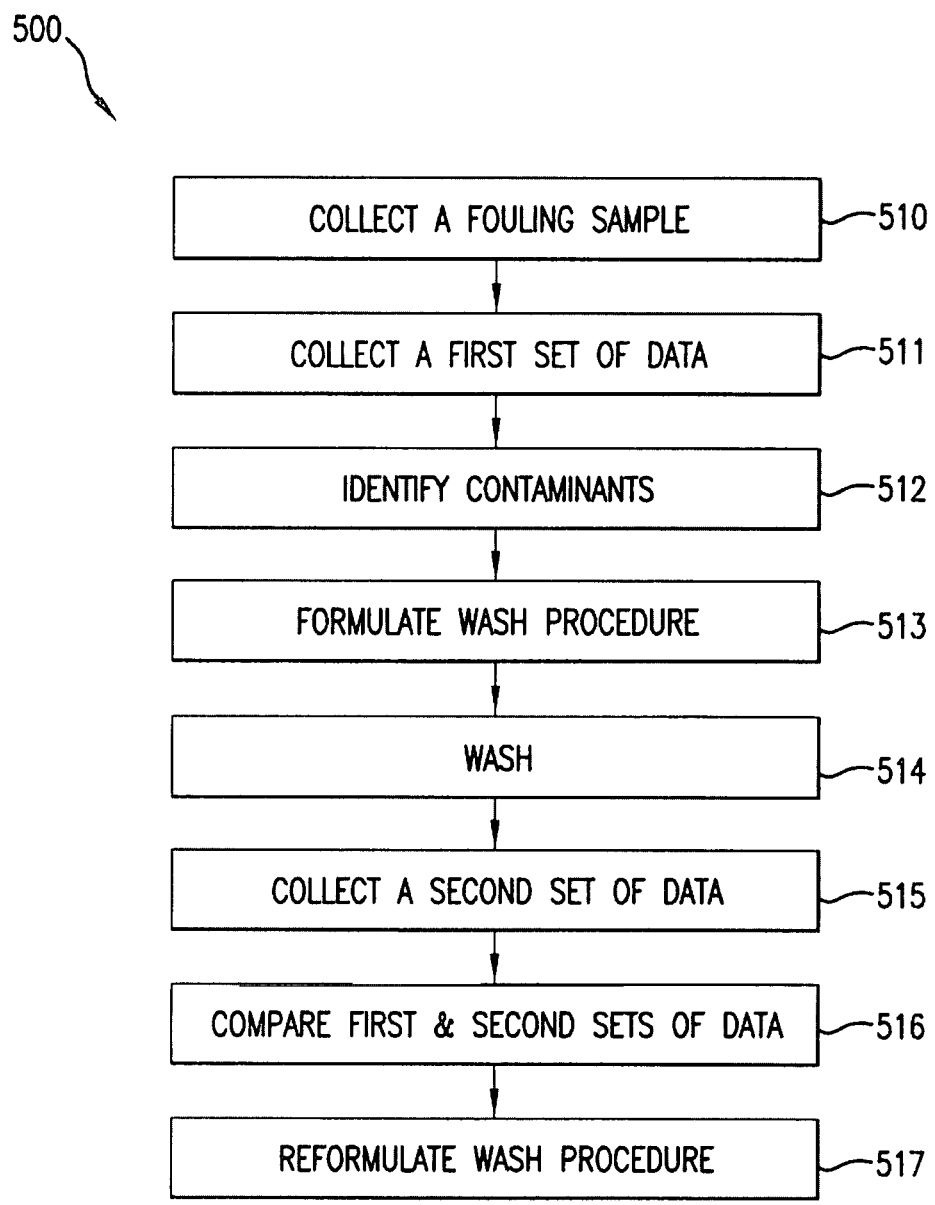
FIG. 5 illustrating wash optimization method 500, in accordance with the present invention.

Referring now to FIG. 5, a flow illustrating wash optimization method 500 in accordance with the present invention is shown. The method begins at step 510, wherein a fouling sample is collected. As previously discussed, due to the large quantities of air utilized by turbines, a large amount of airborne contaminates are fed into the compressor and as a result, fouling adheres to and collects in the compressor of the turbine. Therefore, in order to maintain optimum performance of the turbine, the fouling should be removed. The removal of such fouling may be done by washing. Washing a gas turbine may be performed by injecting a wash solution upstream of a compressor inlet, which is then forced through the compressor. For example, the solution may include water, various chemical agents, detergents, solvents, or any combination thereof, but is not limited thereto. Conventional turbines typically include a discharge drain or an equivalent discharge apparatus, wherein deposits of discharge from the compressor collect. While washing a turbine system, the solution, forced through the compressor, washes off and removes the residual build up of fouling. Thus, a mixture comprising the washing solution used in the washing procedure and the fouling removed during the wash is formed. Some of this mixture is forced out of the rear of the gas turbine, while the rest of the mixture collects in the discharge drain. In a preferred embodiment, a sample of the discharged mixture is taken from the discharge drain after a turbine is washed. This is referred to as 'a water wash and rinse sample'. The water wash and rinse sample preferably comprises one or more contaminates and the original washing solution. Alternatively, the sample of fouling may include a physical sample taken directly from a blade of the turbine. This may be done using any appropriate means such as, for example, using a solvent, a fine abrasive paper, or any other appropriate means, as will be understood by one of ordinary skill in the art.

In a preferred embodiment, wherein the water wash and rinse sample taken from the discharge drain comprises the one or more contaminates and the washing solution, the contaminates are isolated from the solution using a spectral analysis system, namely a mass spectrometer. As will be recognized by those skilled in the art, mass spectrometers are commonly used measure the electron shell spectrum of chemical elements that make up the solution and allow identification of the compounds that make up the solution are devices, and therefore are preferably used in embodiments of the present invention. In this case, the mass spectrometer is preferably used to filter out contaminates from the washing solution comprising, for example, solvents, chemical agents, detergents, and the like. As a result, an isolated sample of the one or more contaminates is produced. Additionally, the same technique may be applied when using a solvent to obtain a fouling sample. Alternatively, in the case where an abrasive paper is used, any appropriate means of isolating the contaminates may be utilized. For example, scraping off the contaminates, thus isolating the contaminates from the abrasive paper. It should be understood however, that, in accordance with the present invention, any appropriate means of isolating the one or more contaminates may be utilized.

In a preferred implementation, in an optional step 511, a first set of data is collected. As will be recognized by one of ordinary skill in the art, fouling does not have a defined composition and typically any number of factors may influence its composition. For example, types of contaminates and quantities of contaminates may vary from location to location; one location may have a higher concentration of a certain contaminate, whereas a different location may have a lower concentration of that contaminate or even no trace of that contaminate. Furthermore, contamination may have a seasonal variation due to such things as local vegetation, industrial process, prevailing weather, etc. Other ambient factors may also vary. As a result, to cope with the variation in contaminates, such considerations are preferably taken into account in formulating a wash procedure, as further discussed in step 513. Thus, the first set of collected data may be data relating to ambient conditions. The ambient conditions may comprise environmental factors that may influence the operation of the gas turbine, including but limited to, weather temperature, weather humidity and weather air pressure. Primarily, the collection of ambient conditions is used as a secondary measure of turbine cleaning effectiveness and aids in defining the optimal timing for performing a turbine wash.

Alternatively, the first set of collected data may be data relating to turbine performance parameters. As further discussed below, evaluating the performance of a turbine before and after washing acts to provide a better gauge of the effectiveness of the selected washing procedure. Therefore, in another embodiment, a turbine monitoring unit collects turbine performance parameters. The turbine performance parameters may comprise, for example, fuel flow, thrust, output, and turbine pressure. In a preferred embodiment, the first set of collected data comprises both ambient conditions and turbine parameters.

Next, in step 512, the sample of one or more contaminates is analyzed, to identify the contaminates comprising the fouling. Any conventional means for identifying contaminates may be utilized. In a preferred embodiment, the mass spectrometer, such as the one previously discussed, is used to identify the one or more contaminates.

Next, in step 513, a wash procedure is formulated according to the identified contaminates. Again, wash procedure refers to the selecting of one or more washing products and determining the amount of time to apply the products to the turbine. In a preferred embodiment, once the contaminates in the sample have been identified, the washing product or combination of washing products may be selected. However, selecting an appropriate solution involves evaluating various criteria.

As will be recognized by one of ordinary skill in the art, solubility of the contamination will be greater for specific washing products; hence having identified the specific type of contaminates, it is desirable to select the most effective washing product(s) to best remove the contaminates. Thus, in a preferred embodiment, one of the criteria involved in selecting a washing product may be to evaluate the product's ability to remove the identified contaminates. The selection of appropriate washing products may be done using a computer, such as the computer 210 previously described or may be done manually by referencing data relating to contaminate solubility in various washing products. Preferably, a computer is used, wherein the computer is connected to a database comprising washing products, including those that are commercially available. The database may further includes information relating to the solubility of known contaminates. In the database, washing products are preferably categorized according to their respective ability to remove various contaminates. Additionally, each washing product comprises an optimal amount of time with which to apply the washing product to each contaminate. More specifically, for each washing product, listed is the amount of time required for that washing product to remove an amount of a given contaminate. As discussed further, these times are preferably utilized in predetermining the amount of time to apply the one or more selected washing products. In practice, the computer may be used to perform a manual or automated search of the database. In a preferred implementation, the database is searched using a search engine feature and which generates a list of commercially available washing products. The listed products are then plotted against a solubility index, in order to determine the best product or products to use for removing a specific contaminates. Together with the ambient factor data collected, one or more washing products may then be selected to remove the contaminates from the turbine according to the solubility index.

Next, in step 514, the turbine from which the sample of fouling was taken, is then washed using the selected one or more washing products for a predetermined amount of time. Any conventional washing system and method may be utilized, in accordance with the present invention.

In a preferred implementation, in an optional step 515, a second set of data is collected. Preferably, the second set of collected data comprises information relating to both ambient conditions and turbine performance parameters. The ambient conditions may comprise environmental factors that may influence the operation of the gas turbine, such as temperature, humidity and air pressure. Additionally, a turbine monitoring unit collects turbine performance parameters. The turbine performance parameters may comprise, for example, fuel flow, thrust, turbine output, and turbine pressure.

In a preferred implementation, in an optional step 516, the first and second sets of data are compared. As previously mentioned, optimal performance of a turbine maximizes production, while minimizing the amount of fuel used. Contaminates act to reduce the compressor efficiency, and therefore the collection of contaminants is preferably collected in a manner other than by washing the turbine. However, in order to effectively gauge the effectiveness of the selected washing products and the application of those products for a predetermined amount of time, data is preferably collected both before and after washing. Thus, the effectiveness may be determined by comparing the performance of the turbine before and after the wash. Ideally, the washing products and application time selected result in improved and preferably maximized performance of the turbine. Furthermore, preferably an ideal performance benchmark is determined such that the benchmark represents an expected level of performance of the turbine. Therefore, in a preferred embodiment, the turbine performance data collected after the wash is compared to the performance data collected before the wash, to determine the increase, or lack thereof, in turbine performance. As will be recognized by those skilled in the art, after washing the turbine, performance may and, preferably will, increase substantially. Therefore, it is also preferred that the increase also be compared to the benchmark performance level, to determine if the selected washing products and application time resulted in an optimal wash.

In the case where optimal performance of the turbine is not achieved, it is preferable to reformulate the selected washing procedure (Step 517) so as to optimally wash the turbine, thus providing maximum turbine performance. Therefore, the ambient conditions are again evaluated after the wash and are further compared to the conditions before the wash. In addition to the compared performance data and ambient condition data, the contaminate solubility is again evaluated and a subsequent washing procedure, of washing products and application time, is formulated accordingly.

A variety of modifications to the embodiments described will be apparent to those skilled in the art from the disclosure provided herein. Thus, the invention may be embodied in other specific forms without departing from the spirit or essential attributes thereof and, accordingly, reference should be made to the appended claims, rather than to the foregoing specification, as indicating the scope of the invention.

What is claimed:

1. A system of optimizing a wash procedure for a combustion turbine engine, the engine having an engine inlet and an engine outlet, the system comprising:

means for collecting a sample of fouling contained in at least one of a water wash and water rinse sample, that has exited the engine outlet as a result of the washing procedure, wherein the sample of fouling comprises one or more contaminates;

means for identifying the one or more contaminates; and means for selecting one or more washing products for removing the one or more contaminates from a turbine, wherein the one or more washing products are selected according to a contaminate solubility index of the identified one or more contaminates.

2. The system of claim 1 further comprising: means for washing the turbine using the selected one or more washing products for a predetermined amount of time.

3. The system of claim 1, wherein the sample of fouling a physical sample.

4. The system of claim 3, wherein the collecting means comprises a solvent.

5. The system of claim 3, wherein the collecting means comprises an abrasive paper.

6. The system of claim 3, wherein the collecting means comprises a scraper.

7. The system of claim 1, wherein the identifying means comprises a mass spectrometer.

8. The system of claim 1, wherein the one or more washing products are commercially available.

9. The system of claim 2, further comprising: means for collecting a first set of data regarding one or more turbine parameters.

10. The system of claim 9, wherein the one or more turbine parameters comprises turbine thrust.

11. The system of claim 9, wherein the one or more turbine parameters comprises turbine output.

12. The system of claim 9, wherein the one or more turbine parameters comprises turbine pressure.

13. The system of claim 9, wherein the one or more turbine parameters comprises fuel flow.

14. The system of claim 9 further comprising: means for collecting a second set of data regarding one or more ambient conditions.

15. The system of claim 14, wherein the one or more ambient conditions includes ambient weather temperature data.

16. The system of claim 14, wherein the one or more ambient conditions includes ambient weather humidity data.

17. The system of claim 14, wherein the one or more ambient conditions includes ambient weather pressure data.

18. The system of claim 14, wherein the one or more ambient conditions includes location data.

19. The system of claim 14, wherein the one or more ambient conditions includes season data.

20. The system of claim 14 further comprising: means for comparing first and second data sets before the turbine is washed with first and second data sets collected after the turbine is washed; and means for formulating an optimized wash procedure.

21. The system of claim 20, further comprising: a turbine washing unit.

22. The system of claim 21, wherein the system controls the turbine washing unit.

23. The system of claim 20, further comprising: means for formulating a performance trend of the turbine.

* * * * *